United States Patent [19]
Chiotis et al.

[11] Patent Number: 5,324,564
[45] Date of Patent: Jun. 28, 1994

[54] WRAP-AROUND HEAT-RECOVERABLE SEALING ARTICLE

[75] Inventors: Achilles Chiotis, Menlo Park; Paul Martens, Fremont; Deran Bacon, Santa Clara, all of Calif.

[73] Assignee: Raychem Corporation, Menlo Park, Calif.

[21] Appl. No.: 982,267

[22] Filed: Nov. 25, 1992

Related U.S. Application Data

[63] Continuation of Ser. No. 808,967, Dec. 16, 1991, abandoned, which is a continuation of Ser. No. 566,782, Aug. 13, 1990, abandoned, which is a continuation of Ser. No. 174,758, Mar. 29, 1988, abandoned.

[51] Int. Cl.$^5$ .................................... C09J 7/02
[52] U.S. Cl. .................................... 428/124; 428/349; 428/355
[58] Field of Search ............... 428/124, 127, 128, 129, 428/177, 913, 345, 349, 351, 355; 156/84, 86; 174/DIG. 8

[56] References Cited
U.S. PATENT DOCUMENTS 2,137,568 11/1938 Brandenberger .
3,416,991 12/1968 Yoshimura .......................... 428/127
3,483,285 12/1969 Foley .
3,620,896 11/1971 Glasgow .
3,847,721 11/1974 Evans .................................. 428/913
3,899,807 8/1975 Sovish et al. .
4,329,898 7/1983 Pithouse ............................. 156/86
4,521,470 6/1985 Overbergh ......................... 156/86

FOREIGN PATENT DOCUMENTS 0251605 1/1988 European Pat. Off. .
2370225 11/1977 France .
1091588 11/1967 United Kingdom .

Primary Examiner—Jenna L. Davis
Attorney, Agent, or Firm—Sheri M. Novack; Herbert G. Burkard

[57] ABSTRACT

A substrate, such as a splice between two or more wires, a wire bundle or an electrical component, such as a suse, diode or transistor, is enclosed and sealed using a recoverable article comprising a polymeric sheet having an involuted curled section at one end and a sealant having a melt flow index has a specified relationship to the hot modulus of polymeric sheet. In an alternate embodiment, the sealant is a gel.

7 Claims, 4 Drawing Sheets

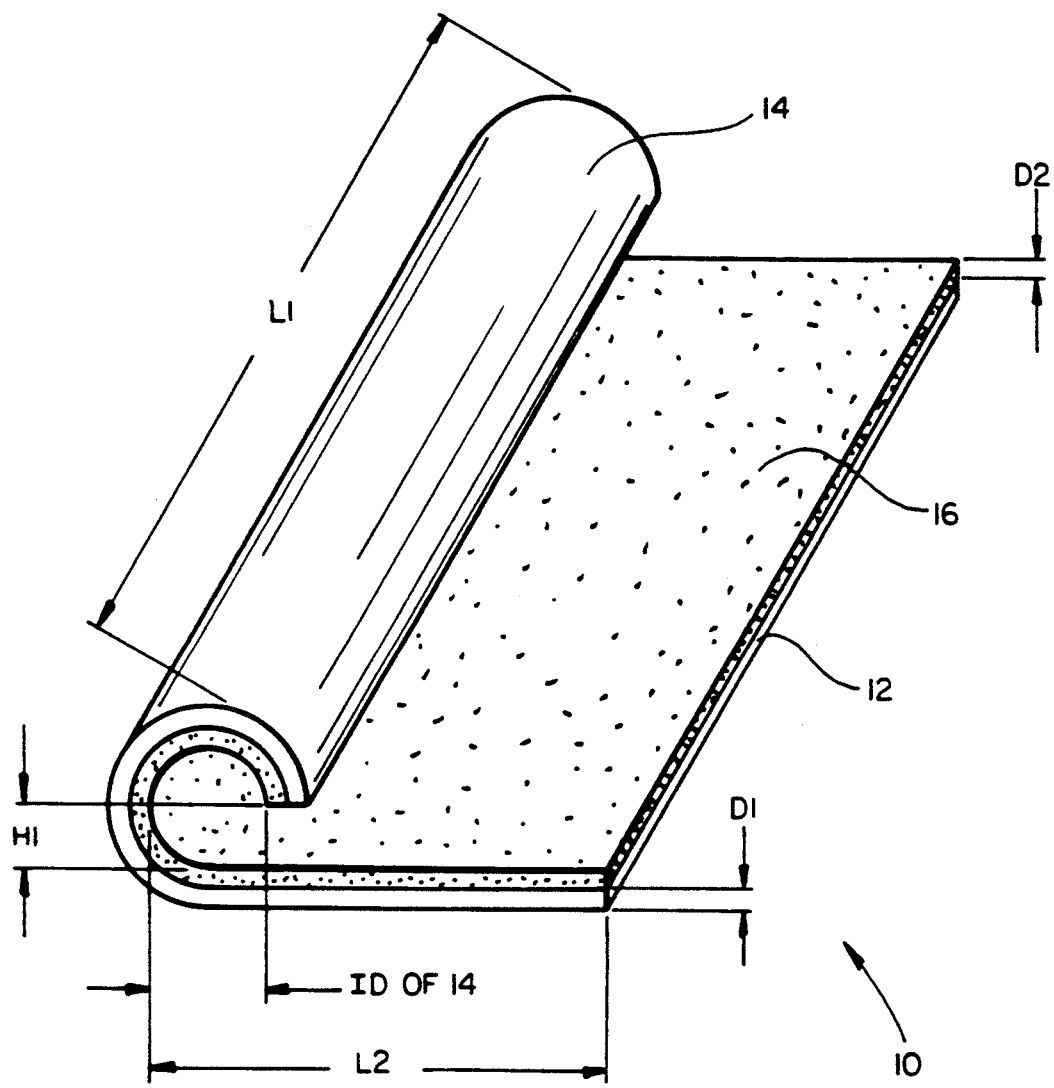
FIG_1

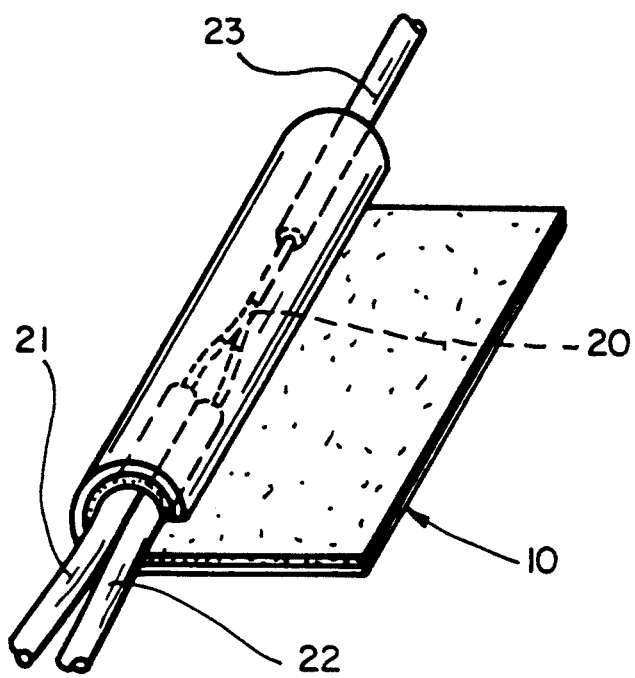
FIG_2
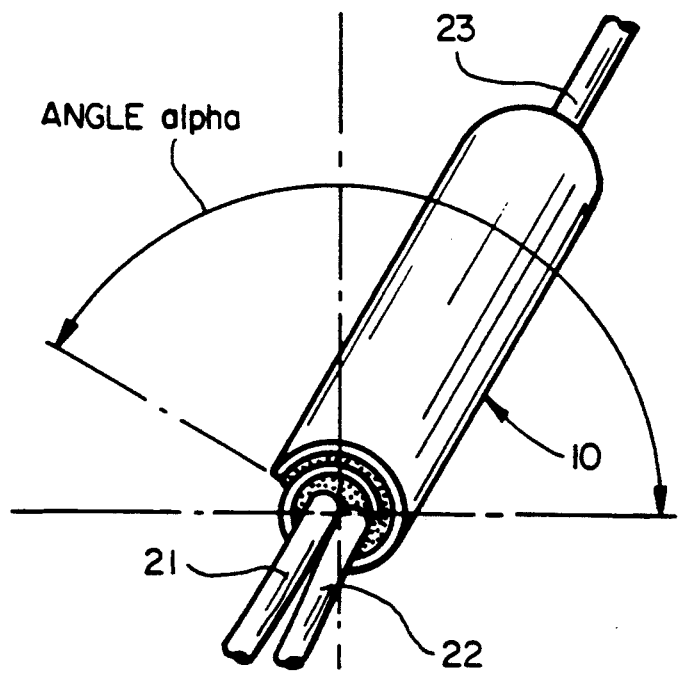
FIG_3

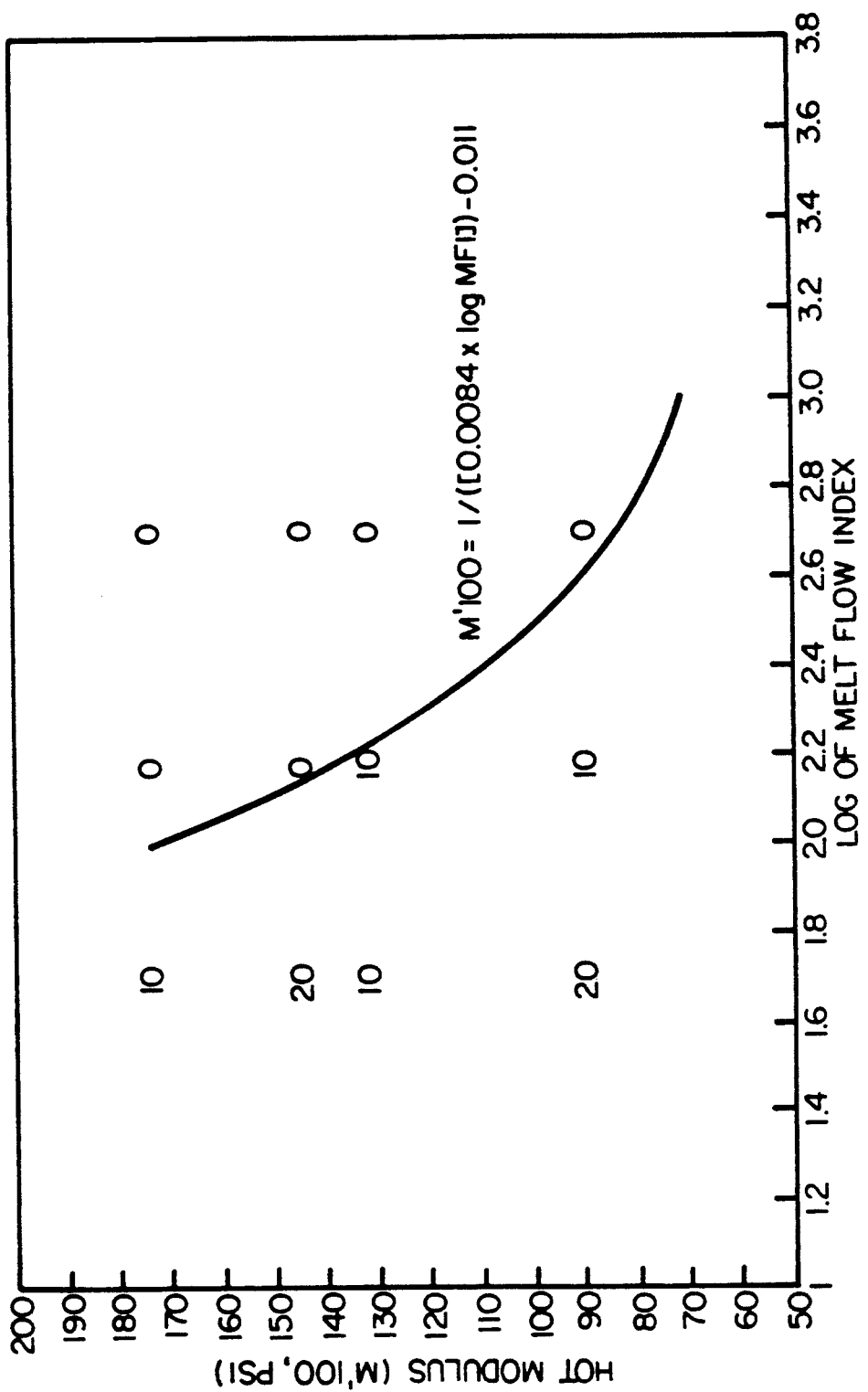
FIG_4

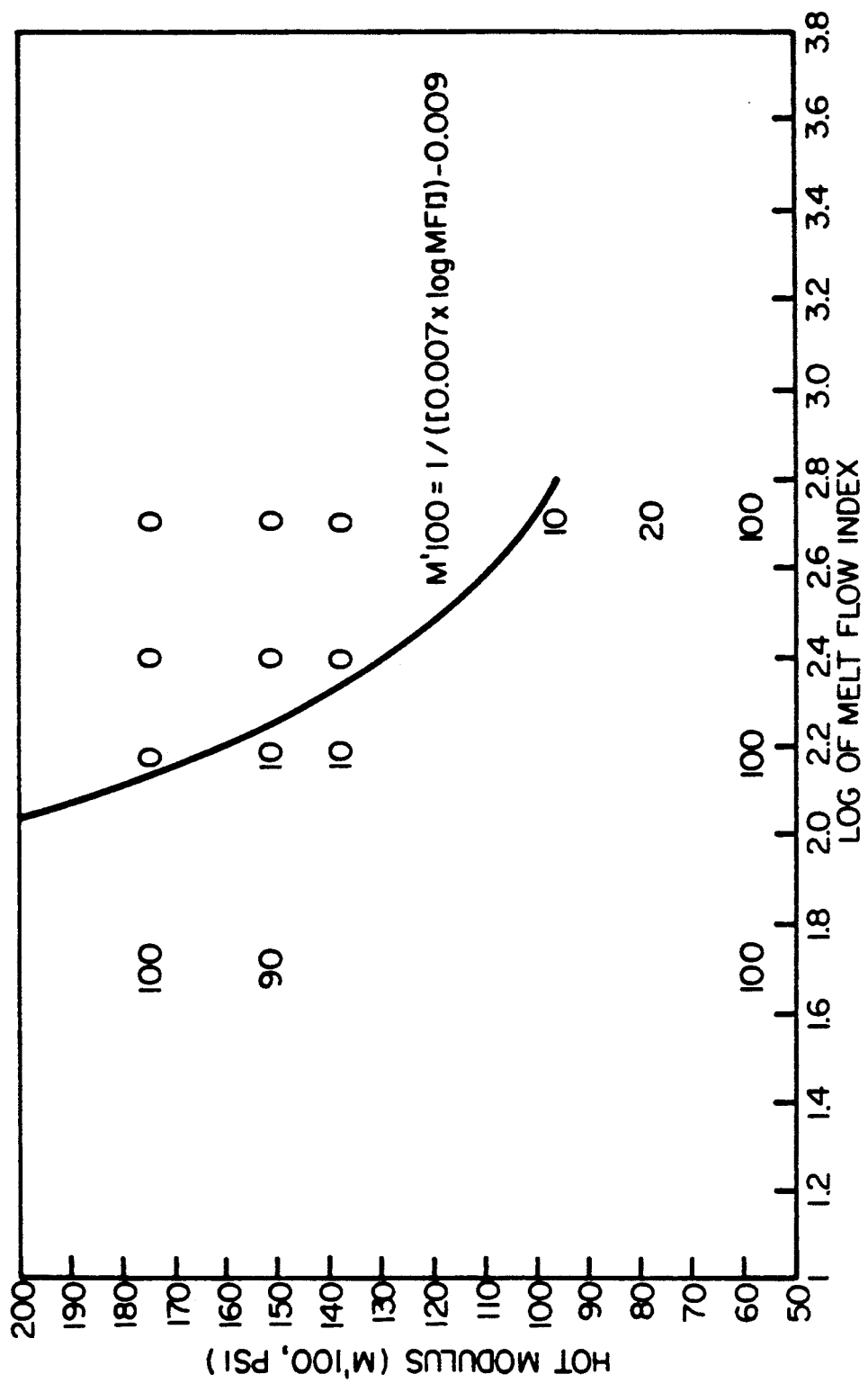
FIG_5

WRAP-AROUND HEAT-RECOVERABLE SEALING ARTICLE

This application is a continuation of application No. 07/808,967, filed Dec. 16, 1991, now abandoned, which is a continuation of 07/566,783, filed Aug. 13, 1990, now abandoned, which is a continuation of 07/174,758, filed Mar. 29, 1988, now abandoned.

BACKGROUND OF THE INVENTION

This invention relates to enclosing and sealing a substrate, such as a plurality of wires or a splice between two or more wire, and to an assembly comprising a heat recoverable article for effecting such sealing.

When two or more insulated wires are spliced together, the insulation is generally removed from the section of the wires which are to be joined together by soldering, crimping, or the like. After the wires have been spliced it is desirable to insulate the splice area, that is the entire area of the splice and adjacent bared wires. This entire area is referred to herein as the splice. The splice area may also include an electrical component such as a fuse, diode or transistor or the like spliced to the wires. It is also desirable to seal the area between adjacent wires of a splice, wire bundle or cable to prevent ingress of water, solvents or other contaminants and migration of such contaminants along the insulation of the individual wires.

Various approaches have been proposed to insulate and seal splices and wire bundles. One approach has been to use a heat recoverable tubular article, optionally coated with a hot melt adhesive or sealant. This requires access to a free end of the wires and installation of the recoverable tubing before the wires are spliced. After the wires are spliced, the tubing is slid over the splice and heat is applied to cause recovery of the tubing and to cause the adhesive or sealant to melt and flow. An example of such a heat recoverable tubular article is sold commercially by Raychem Corporation under the trademarks "FLT", "SCT" and "MVT".

At times it is not convenient or feasible to install the recoverable tube over the wires, particularly when three or more wires are involved or a branch is joined to another wire. The use of a heat recoverable wrap-around article has been proposed for example in U.S. Pat. Nos. 3,847,721 to Evans and 3,899,807 to Sovish. Evans discloses articles rendered involutely heat recoverable by differentially annealing a molecularly oriented unitary polymeric layer so as to provide an anisotropic gradient through the thickness thereof. Sovish et al discloses articles rendered involutely heat recoverable by lamination of a first heat recoverable layer to a second, relatively non-heat recoverable layer which resists linear recovery of the first such that the laminated article curls upon recovery. It is believed that the Evans and Sovish et al articles have not met with commercial success primarily due to the circumstance that it is difficult to control the final shape of the article.

Another device which is recoverable to form an enclosing tube is Foley U.S. Pat. No. 3,483,285. The device is used as a clamp for encircling wires or cables. Glasgow U.S. Pat. No. 3,620,896 also discloses a cable clamp. The use of an adhesive to bond the wraparound article to itself and to the underlying substrate is mentioned. A wrap-around recoverable article particularly suitable for use as a marker sleeve is disclosed in commonly assigned copending application Ser. No. 877,620 filed Feb. 9, 1988 by Hansen et al, the entire disclosure of which are incorporated herein by reference. Other wrap-around articles are disclosed in U.S. Pat. Nos. 2,138,568 to Brauduberger and 3,416,991 to Yoshimura and British Patent No. 1,091,588 to Toyoba.

None of these references address the problem of sealing a plurality of wires or a splice.

SUMMARY OF THE INVENTION

This invention provides an assembly comprising a heat recoverable wrap-around article and a sealant for providing a seal between a plurality of wires, a splice between two or more wires or other substrate.

One aspect of this invention comprises an assembly suitable for enclosing and sealing a substrate, said article comprising:
  a) a sheet of polymeric material, said sheet being capable upon application of heat of assuming an overlapped tubular configuration having an angle of overlap between about 25° and about 360° and defining a volume, V1, said sheet having at one end thereof an involuted curled section;
  b) a sealant adapted to be positioned within said involuted curled section, the volume, V2, of the sealant being at least as great as the difference between the volume, V1 and the volume, V3, of the substrate to be enclosed;

wherein the hot modulus, M'100, of said sheet and the melt flow index, MFI, of the sealant is such that:

$$M'_{100} \geq \frac{1}{[K1 \times \log MFI] - K2}$$

where K1 is between about 0.0001 and about 0.015 and K2 is between about 0.001 and about 0.020.

Another aspect of this invention comprises a method of and sealing a substrate, which method comprises:
  (A) positioning around the substrate a heat recoverable article comprising a sheet of polymeric material, said sheet being capable upon application of heat thereto assuming an overlapped tubular configuration having an angle of overlap between about 25° and about 360° and defining a volume, V1, said sheet having at one end thereof an involuted curled section, said article being positioned around the substrate so that the involuted curled section substantially surrounds the substrate;
  (B) positioning a sealant so that it substantially surrounds said substrate within the involuted curled section, the volume, V2, of the sealant being at least as great as the difference between the volume, V1, and the volume, V3, the substrate to be enclosed;

the hot modulus, M'100 of said sheet and the melt flow index, MFI, of the sealant being such that:

$$M'_{100} \geq \frac{1}{[K1 \times \log MFI] - K2}$$

where K1 is between about 0.0001 and about 0.015 and K2 is between about 0.001 and about 0.020.
  (C) heating the article to cause it to recover and substantially completely surround the substrate; and
  (D) continuing to heat the article to cause the sealant to melt and flow and seal substantially the entire volume within the recovered article.

The substrate can be for example, a plurality of wires, a splice between two or more wires or an electrical component. In a further embodiment, a gel having a specified cone penetration and elongation is used in place of the sealant.

The involuted curled section preferably has an inner diameter equal to or greater than the substrate, i.e. the splice, wires, or electrical component to be enclosed, at its largest point.

BRIEF DESCRIPTION OF THE DRAWINGS

FIG. 1-3 illustrate a heat recoverable article suitable for use in this invention, installation of that article over a wire splice and the resulting sealed splice.

FIG. 4-5 are graphs showing the hot modulus/melt flow index failure envelope for articles of this invention utilizing polyvinylidene fluoride and polyethylene, respectively, as the polymeric sheet.

DETAILED DESCRIPTION OF THE INVENTION

The assembly of this invention comprises an article capable of assuming a spiral configuration and a sealant. The article comprises a sheet of polymeric material having an involuted curled section at one end thereof. The polymeric material is crosslinked and preferably is selected from the group consisting of polyethylene, vinylidene fluoride polymers, including homopolymers and thermoplastic copolymers, nylon, such as nylon 11 or nylon 12, and polyesters, such as polybutylene terephthalate. Any other polymer capable of having elastic memory imparted thereto can be used.

The polymer is generally used together with various additives and fillers, including for example, antioxidants such as alkylated phenols, e.g. those commercially available as Goodritte 3125, Irganox 1010, Irganox 1035, Irganox 1076, Irganox 1093, Vulkanox BKF, organic phosphite or phoshates, e.g. dilauryl phosphite, Mark 1178, alkylidene polyphenols, e.g. Ethanox 330, thio-bis alkalated phenol, e.g. Santonox R, dilauryl thiodipropionate, e.g. Carstab DLTDP, dimyristyl thiodipropionate, e.g. Carstab DMTDP, dimyristyl thiodipropionate, e.g. Carstab STDP, amines, e.g. Wingstay 29 etc; UV stabilizers such as [2,2′-thio-bis(4-t-octylphenolato)] n-butylamine nickel, Cyasorb UV 1084, 3,5-ditertiarybutyl-phydroxybenxoic acid, UV Chek AM-240; flame retardents such as decabromodiphenyl ether, perchloropentacyclodecane, 1,2-bis (tetra bromophthalimido) ethylene; pigments such as titanium dioxide, antimony trioxide, zinc oxide, iron oxide, etc, and the like. Mixtures of such additives and fillers can be used.

FIG. 1 illustrates a typical article of this invention. In this embodiment, a layer of sealant is applied to the inner surface of the involuted curled section of the article. In FIG. 1, the wrap-around article 10 of this invention comprises a strip of heat-recoverable polymeric material 12, one end of which is in the shape of an involuted curl, 14. The inner diameter of the involuted curled section preferably is at least as great as the outer diameter of the substrate, i.e. the wires, splice or electrical component should be substantially completely encircled by the involuted curled section when this section is placed therearound. As shown in FIG. 1, there is preferably a gap, $H_1$, between the end of the curl and the sheet. The gap preferably is large enough to permit the wires or splice to be readily slid into the curl yet small enough to retain the wires or splice inside the curled section during installation. The size of the gap depends on the number of wires, the size of the wires and/or the splice or electrical component spliced between the wires. In general, the gap should be between about 70% and about 100% of the outer diameter of the largest point of the substrate to be enclosed, and preferably between about 80% and about 90%.

The inner surface of the involuted curl section is coated with a sealant, 16. The melt flow index of the sealant should be at least about 65 and more preferably at least about 100 and most preferably at least about 250. The melt flow index of the sealant depends on its composition, whether it has been crosslinked and if crosslinked, to what extent. It has been found that to ensure proper sealing of the wires or splice, the melt flow index, MFI of the sealant and the hot modulus, $M'_{100}$, of the polymeric sheet should be such that the following relationship is satisfied:

$$M'_{100} \geq \frac{1}{[K1 \times \log MFI] - K2}$$

where K1 is between about 0.0001 and about 0.015, preferably between about 0.0024 and about 0.0106 and more preferably between about 0.0047 and about 0.013 and especially between about 0.0065 and about 0.0090; and K2 is between about 0.001 and about 0.020, preferably between about 0.003 and about 0.017, more preferably between about 0.006 and about 0.013 and especially between about 0.008 and 0.012. The melt flow index is determined using ASTMD 1238-70 (as modified in "Elvax" Resins Determination of Melt Index, Technical Information Bulletin of du Pont dated May 23, 1977).

In other embodiments of the invention, the sealant need not be coated on the inner surface of the curled section. For example, the sealant can be in the form of an extruded profile which surrounds the wire or wires, or in the form of a sheet or tape which can be wrapped around the wires and the crimp, or the like.

The amount of sealant used within the involuted curled section should completely seal the wires, splice or electrical component after the article has recovered. Thus the volume of sealant, V1, should be at least equal to the difference in volume between the volume of the recovered article V2, and the volumes of the wires of the splice, V3, to be protected. Too little sealant will result in incomplete sealing while excess adhesive will be forced from the spliced area on heating and recovery of the article. The sealant is preferably a heat activatable adhesive, such as a hot melt adhesive, or mastic. On heating, the adhesive melts and flows around and between the wires of the splice. On subsequent cooling the adhesive solidifies or becomes sufficiently viscous that it seals the entire volume within the recovered article. It also adheres to the wires and wire insulation as well as the inner surface of the article water and prevents water and solvents, if present from wicking or traveling along the wires.

An alternate material having adhesive properties that can be used as a sealant in this invention comprises a polymeric gel. It is preferred to use a gel of any of the types described in U.S. Pat. Nos. 4,600,261 and 4,634.207 and European Published patent application No 174,165 to Chang, et al, the disclosures of which are incorporated herein by reference. Particularly preferred is a material having a cone penetration between 80 and 350($10^{-1}$mm) preferably between 100 and 350($10^{-1}$mm), more preferably between 200 and 300 ($10^{-1}$mm) and most preferably between 240 and 270($10^{-1}$mm); and an and ultimate elongation of a least 50%, preferably in excess of 100%, more preferably in excess of 200–300%, and possibly in excess of 500%. All cone penetration values cited herein are determined in accordance with American National Standard Designation ASTM D217-68 on an undisturbed sample at 70° F.±5° F. using a standard 1:1 scale cone (cone weight 102.5 g, shaft weight 47.5 g), the penetration being measured after five seconds. Also, ultimate elongations are determined in accordance with the American National Standard Designation ASTM D638-80, at 70°±5° F., using a Type numeral 4 dye to cut the sample and at a speed of 50 cm/min. The gel can comprise either a urethane, silicone, or a non-silicone liquid rubber with low or no unsaturation prior to crosslinking which is then cross-linked, a preferred non-silicone liquid rubber being liquid butyl rubber.

The gel materials readily conform to the wires or splice to provide a seal. The amount of gel used within the involuted curled section should be at least equal to the difference between the volume $V_1$ of the recovered article and the volume $V_3$ of the wires to be enclosed. The gel does not melt and flow when heat is applied but conforms to fill the space within spiral tube around the wires.

The article is formed of a polymeric sheet which has been rendered heat recoverable. Heat-recoverable articles are articles, the dimensional configuration of which may be made substantially to change when subjected to heat treatment. Usually these articles recover, on heating, towards an original shape from which they have previously been deformed. The article of this invention recovers to a spiral tubular configuration. During the manufacture thereof, as discussed below, it is formed into the shape of a spiral tube and then deformed into a more open spiral or a planar configuration.

The article of this invention can be prepared by extruding a tube of the desired material, and splitting the tube longitudinally. The longitudinal edges of the slit tubing are overlapped to form a spiral. The angle of overlap of the spiral should be between about 25° and about 360°, preferably between about 45° and 230°. The polymeric material is then crosslinked for example by use of a suitable crosslinking agent, such as a peroxide or amine, or by irradiation. Any other method of preparing a spiral tube of polymeric material can be used.

In a preferred embodiment, the composition is crosslinked by irradiation. The dosage employed in the irradiation step is generally below about 50 Mrads to ensure that the polymer is not degraded by excessive irradiation. The dosage preferably employed depends upon the extent of crosslinking desired, balanced against the tendency of the polymer to be degraded by high doses of irradiation. Suitable dosages are generally in the range 2 to 40 Mrads, for example 2 to 30 Mrads, preferably 3 to 20 Mrads, especially 4 to 25 or 4 to 20 Mrads, particularly 4 to 15 Mrads. The ionising radiation can for example be in the form of accelerated electrons or gamma rays. Irradiation is generally carried out at about room temperature, but higher temperatures can also be used.

Prior to irradiation it is preferred to incorporate a crosslinking agent into the composition. Preferred radiation crosslinking agents contain carbon-carbon unsaturated groups in a molar percentage greater than 15, especially greater than 20, particulary greater than 25, based on the total molar amount of (A) and (B). In many cases the crosslinking agent contains at least two ethylenic double bonds, which may be present, for example, in allyl, methallyl, propargyl, or vinyl groups. We have obtained excellent results with crosslinking agents containing at least two allyl groups, especially three or four allyl groups. Particulary preferred crosslinking agents are triallyl cyanurate (TAC) and triallyl isocyanurate (TAIC); other specific cross-linking agents include triallyl trimellitate, triallyl trimesate, tetrallyl pyromellitate, the diallyl ester of 1,1,3-trimethyl-5-carboxy-3(p-carboxyphenyl) indan.

The polymeric material is crosslinked to provide a hot modulus of at least 85. The hot modulus was determined at temperature above the melting point of the polymer at which a further increase in temperature does not result in a significant change in the modulus. This modulus is referred to herein as $M'_{100}$ and is a measurement of the stress required to elongate a resin by 100% (or to rupture if 100% elongation is not attainable). Higher values obtained from this test indicated increased resistance to elastic deformation and a greater degree of crosslinking. The modulus measurement expressed as the $M'_{100}$ value can be calculated by:

$$M'_{100} = \frac{\text{stress in pounds to elongate sample by 100\%}}{\text{initial cross-sectional area in square inches}}$$

Should the sample rupture prior to 100% elongation, the $M'_{100}$ is calculated using the equation:

$$M'_{100} = \frac{\frac{\text{stress in pounds to elongate sample by 100\%}}{\text{elongation at rupture}}}{\text{initial cross-sectional area in square inches}}$$

After the crosslinking step, the spiral tubing is then heated to a temperature above the melting point of the polymer and flattened to a planar configuration. While substantially completely flattening of the tube to a planar configuration is preferred, the spiral tube can be deformed at this stage to an open spiral tube configuration, e.g. to a "C" configuration, if desired.

The sealant can be applied at this stage to the inner surface of the article, i.e. that surface of the article which was the inner surface the spiral tube. If desired, the sealant can be coextruded with the polymeric material into tubing initially or positioned within the involuted curled section at any time up to and including installation of the article. The inner end section of the tubing is then heated causing it to recover toward its spiral configuration creating an involuted curled end section.

As discussed above, the inner diameter of the resulting curled section preferably is greater than the outer diameter of the wires and or splice at its largest point. Further the gap between the end of the curl and the sheet should be less than the outer diameter of the wire or splice at its largest point.

FIG. 2 shows installation of the article 10 around a splice 20 wires 21, 22 and 23. The involuted curled section of article 10 is positioned around the splice. It is to be noted that the inner diameter of the involuted curled section is, in this embodiment, at greater than the splice at its largest point. When heat is applied to the article, it recovers into a final configuration as shown in FIG. 3.

In FIG. 3, recovered article 10 has an angle of overlap, 2, of about 150°. Article 10 is shown surrounding a splice between wires 21, 22 and 23.

The following examples illustrate the preparation of articles of this invention and their use in covering and sealing splices between two or more wires.

EXAMPLE 1

A tubing of polyvinylidene fluoride containing a crosslinking promoter was extruded using a 2 inch extruder. The tubing was slit longitudinally at the exit of the die. The slit tubing was passed through a series sizing dies to obtain a spiral tubing having an angle of overlap of about 135° and a wall thickness of 0.022".

Samples of the tubing was then irradiated in an electron beam accelerator to doses of 5, 12, 18 and 25 Mrads. The hot modulus of each was determined as set forth above. The hot modulus for the samples were 85, 90, 130, and 150 psi respectively.

Each spiral tubing sample was then heated and flattened. A hot melt adhesive was then applied to each sample. The hot melt adhesives used were: an ethylene/vinyl acetate copolymer having a melt flow index of 50 (Elvax 40 commercially available from E. J. duPont de Nemous and Co.), an ethylene (vinyl acetate/acid terpolymer having a melt flow index of 150 (Elvax 4320, also available from du Pont) and an ethylene/vinyl acetate/acid terpolymer having a melt flow index of 500 (Elvax 4310 from du Pont), and a blend of a polyamide, an ethylene/vinyl acetate copolymer and an ethylene/vinyl acetate/acid terpolymer having a melt flow index of 150.

Heat was then applied to one inch regions of the sheet causing it to form an involuted curl. Each finished article was as shown in FIG. 1 and had the dimensions.

$L_1 = 2''$
$L_2 = 0.549''$
$d_1 = 0.022''$
$d_2 = 0.020''$
$ID_1 = 0.135''$
$H_1 = 0.095''$

A number of sample splices were prepared, each between two 18AWG wires insulated with crosslinked polyethylene by removing 0.600" of the insulation of the wires and then joining the ends of the wires by ultrasonic welding.

The curled end section of each sample article was positioned over a sample splice and the assembly was heated using an infrared heater at 800° C. for 12 seconds to cause the article to recover around the splice.

Each sample was tested by immersing the splice in a 5% sodium chloride aqueous solution for 24 hours at room temperature and then measuring the current between the NaCl solution and the conductors of the splice at 50 volts, direct current. The splice passed the test if the current was 0.250 micro-amps or less. The failure rates were plotted as a function of the hot modulus of the tubing and melt flow index of the adhesive as shown in FIG. 4. Samples within the area to the right of the curve showed no failures while those to the left showed a failure rate of at least 10%. It was determined that for 0 failure rate the following relationship was satisfied:

$$M'_{100} \geq \frac{1}{0.0084 \log MFI - 0.011} \quad \text{Example 2}$$

A spiral tubing of polyethylene containing a crosslinking promoter was extruded, using a ¾" extruder. The tubing was slit longitudinally and as in Example 1 passed through sizing dies to form a spiral tubing.

The spiral tubing having an angle of overlap of 90° was then irradiated to dosages of 10, 20, 40, and 60 Mrads, to give hot modulus of 60, 70, 125, and 160 psi. Heat recoverable articles were prepared as in Example 1 using the same adhesives and each sample installed on 2:1 wire splice. The failure rates were plotted and it was determined that at zero failure rate, the following relationship was satisfied.

$$M'_{100} \geq \frac{1}{0.007 \log MFI - 0.009}$$

While the invention has been described herein in accordance with certain preferred embodiments thereof, many modifications and changes will be apparent to those skilled in the art. Accordingly, it is intended by the appended claims to cover all such modifications and changes as fall within the true spirit and scope of the invention.

What is claimed is:

1. An assembly for enclosing and sealing a splice between two or more wires, said assembly comprising:
   a) a sheet of polyvinylidene fluoride, said sheet being capable upon installation over the splice and on application of heat thereto of assuming an overlapped tubular configuration having an angle of overlap between about 45° and about 180° and defining a volume, V1, said sheet having at one end thereof an involuted curled section;
   b) registration means for positioning the assembly over the splice and a region of each wire adjacent the splice; and
   c) a sealant comprising a hot melt adhesive adapted to be positioned within said involuted curled section, the volume, V2, of the sealant being at least equal to the difference between V1 and the volume V3, of the splice to be enclosed;

wherein the hot modulus, $M'_{100}$, of the sheet and the melt flow index, MFI, of the sealant are such that:

$$M'_{100} \geq \frac{1}{0.0084 \log MFI - 0.011}$$

and wherein the hot melt adhesive comprising a polyamide, an ethylene-vinyl acetate copolymer, an ethylene-vinyl acetate-acid terpolymer, or mixtures thereof.

2. an assembly for enclosing and sealing a splice between two or more wires, said assembly comprising:
   a) a sheet of polyethylene, said sheet being capable upon installation over the splice and on application of heat thereto of assuming an overlapped tubular configuration having an angle of overlap between about 45° and about 180° and defining a volume, V1, said sheet having at one end thereof an involuted curled section;
   b) registration means for positioning the assembly over the splice and a region of each wire adjacent the splice; and
   c) a sealant comprising a hot melt adhesive adapted to be positioned within said involuted curled section, the volume, V2, of the sealant being at least equal to the difference between V1 and the volume V3, of the splice to be enclosed;

wherein the hot modulus, $M'_{100}$, of the sheet and the melt flow index, MFI, of the sealant are such that:

$$M'_{100} \geq \frac{1}{0.007\log MFI - 0.009}$$

and wherein the hot melt adhesive comprising a polyamide, an ethylene-vinyl acetate copolymer, an ethylene-vinyl acetate-acid terpolymer, or mixtures thereof.

3. An assembly in accordance with claim 1 or claim 2 wherein the inner diameter of said involuted curled section is at least equal to the outer diameter of the splice at its largest point.

4. An assembly in accordance with claim 1 or claim 2 wherein said sealant is coated on the inner surface of said involuted curled section and extends along that surface of said sheet.

5. An assembly in accordance with claim 1 or claim 2 wherein the $M'_{100}$ of the sheet is at least about 85 psi.

6. An assembly in accordance with claim 1 or claim 2 wherein the melt flow of the adhesive is such that log MFI is at least about 2.

7. An assembly in accordance with claim 1 or claim 2 wherein the edge of involuted curled section is spaced from the surface of the adhesive coated sheet by a distance less than the diameter of the splice at its largest point.

* * * * *